United States Patent
Riggs et al.

(10) Patent No.: US 11,301,465 B2
(45) Date of Patent: Apr. 12, 2022

(54) MEDIA PLAYER FEEDBACK

(71) Applicant: Adobe Inc., San Jose, CA (US)

(72) Inventors: Brian Riggs, San Francisco, CA (US); Vijay S. Ghaskadvi, San Jose, CA (US); Joel Huff, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 1445 days.

(21) Appl. No.: 13/855,210

(22) Filed: Apr. 2, 2013

(65) Prior Publication Data
US 2013/0226962 A1 Aug. 29, 2013

Related U.S. Application Data

(63) Continuation of application No. 11/841,232, filed on Aug. 20, 2007, now Pat. No. 8,429,516.

(51) Int. Cl.
G06F 17/30 (2006.01)
G06F 16/245 (2019.01)
G06F 21/62 (2013.01)

(52) U.S. Cl.
CPC ........ G06F 16/245 (2019.01); G06F 21/6254 (2013.01); G06F 2221/2101 (2013.01)

(58) Field of Classification Search
CPC .... G06F 17/30; G06F 16/245; G06F 21/6254; G06F 2221/2101
USPC ....................................................... 715/201
See application file for complete search history.

(56) References Cited

U.S. PATENT DOCUMENTS

| | | | | |
|---|---|---|---|---|
| 8,688,991 B1* | 4/2014 | Sunil | ...................... | H04L 63/06 380/30 |
| 2002/0138619 A1* | 9/2002 | Ramaley | ........... | H04L 29/06027 709/226 |
| 2003/0088645 A1* | 5/2003 | Ferraro | .................. | G06Q 10/10 709/218 |
| 2007/0067241 A1* | 3/2007 | Malik | .................... | G06Q 99/00 705/51 |
| 2007/0092204 A1* | 4/2007 | Wagner | .................. | H04N 5/782 386/241 |
| 2007/0283008 A1* | 12/2007 | Bucher | .............. | G06Q 30/0201 709/224 |
| 2009/0024923 A1* | 1/2009 | Hartwig | ........... | G06F 17/30781 715/716 |

* cited by examiner

Primary Examiner — Kavita Stanley
Assistant Examiner — Tionna M Burke
(74) Attorney, Agent, or Firm — Kilpatrick Townsend & Stockton LLP

(57) ABSTRACT

Example configurations herein include a media player that initiates playback of content (e.g., play back of a movie in a web browser). Based on input from a respective user, the media player receives selections of playback commands (e.g., play, pause, stop, rewind, fast forward, etc.) applied to the content being played back by the media player. Based on the selections, the media player creates a log report. The log report records the selections of the playback commands applied to the content and indicates, for example, a corresponding time when the playback commands were applied. According to one configuration, the media player initiates distribution of the log report to notify a publisher associated with the content which playback commands were selected during playback of the content on the media player.

20 Claims, 10 Drawing Sheets

MEDIA PLAYER FEEDBACK

CROSS-REFERENCE TO RELATED APPLICATIONS

This application is a continuation of U.S. patent application Ser. No. 11/841,232, filed Aug. 20, 2007, the contents of which are incorporated herein by reference in their entirety.

BACKGROUND OF THE INVENTION

Conventional computer systems enable production and distribution of multimedia data, including video, audio and image data. Such production is increasing at a phenomenal rate due to the growing popularity of the Internet, the growing affordability of personal computers capable of efficiently processing multimedia data to provide a pleasing experience for users, and the enhanced viewing experience that multimedia provides over "text-only" type images.

People now access and use multimedia data in numerous ways. One way that people access multimedia data is over a network such as the Internet. For example, people using web browsers on personal computers now routinely access multimedia data by surfing the World Wide Web via the Internet.

Countless numbers of content providers link multimedia data to web pages accessible by people using web browsers. Accordingly, via use of today's web pages, persons using media player applications (e.g., web browsers) can access a web server operated by a content provider to playback content such as view video clips, listen to audio clips, or view images made available by the content provider.

To request media content such as digital video, audio, or some other sampled content from a server, a corresponding client typically provides the global address of the content in the form of a Uniform Resource Locator (URL). After receiving a request for content, a respective server then accesses the content and sends or "streams" it to the client as a continuous data stream that is played back by the client as the stream is received. Alternatively, the client can render the content for viewing by the user (e.g., via a media player application) upon completion of the receiving the content data from the server to the client.

BRIEF SUMMARY OF THE INVENTION

Conventional media player applications that render content from a content publisher(s) suffer from a number of deficiencies. In particular, one such deficiency is the lack of useful feedback provided to the publisher. For example, conventional media player applications may only provide a content publisher with an indication that the content was in fact rendered by the media application. In certain cases, if a user consents, the publisher may be apprised of an identity of the media player application that played back the publisher's content.

Embodiments disclosed herein can significantly overcome such deficiencies and/or other deficiencies in the prior art. For example, embodiments herein provide a media player that records events such as occurrence of playback commands and related playback information so that a respective publisher can be apprised of commands that are applied to content during playback. This enables the publisher to identify corresponding portions of such content that are most appealing to a viewer.

According to general embodiments, a media player initiates playback of content (e.g., a movie in a web browser). The media player receives selection of one or more playback commands (e.g., play, pause, fast forward, rewind, etc.) to be applied to the content being played back by the media player. For example, a user can generate such commands based on input to a keyboard, computer mouse, etc. Based on the selection, the media player creates a log report. The log report records the selections of the playback command and indicates additional playback information such as a corresponding time when the commands were applied. According to one configuration, the media player (or function associated with the media player) initiates distribution of the log report to notify a publisher of playback information associated with the content played back on the media player.

In more specific embodiments, the media player can identify a publisher associated with the content being played back by the media player and include a value in the log report associated with the publisher in the log report. To obtain the value (e.g., publisher information), the media player queries a table to determine if the media player has a corresponding value for the particular publisher. If, for example, the table already has a unique value for the publisher, the media player retrieves and includes the value in any log reports related to play back of content associated with the respective publisher.

However, if the publisher identifier table does not already have a unique value for the particular publisher, the media player can generate or obtain a unique value (e.g., via a random number generator function or other source) for that publisher and store it in the publisher identifier table for future use.

As further discussed below, note that each of multiple media players playing back content for a given publisher can store and use different values for inclusion in respective log reports. As will be discussed later in this specification, use of the unique publisher identifier value in the log reports enables the publisher(s) to view the log reports and identify which media players play different content provided by a respective publisher.

In addition to being able to identify which publisher's content is played back by the same media player, the publisher can deduce, based on the contents (e.g., events) of the log reports, which portions of the played back content a viewer finds most interesting or appealing.

According to one configuration, the media player distributes the log reports to one or more remote locations (e.g., servers) that are accessible by multiple content publishers. The publishers access the data in the servers and, in turn, analyze the log reports as mentioned above to identify events that occur during playback.

According to one embodiment, the log reports created by each of the different media players do not reveal an identity of the corresponding media player playing back the corresponding content. In other words, according to one embodiment in which anonymity is maintained with respect to creation of the log reports, there is no information in the log reports that enables the respective publisher to identify the specific media player that plays back the respective content. Instead, the log reports include only a unique value (created or obtained by the respective media player) that is consistently used by the given media player to mark each log report for corresponding content played back by a respective publisher. Based on processing of the log report information, the publisher can identify which of the publisher's content is played back on the same media player.

For example, assume that a first media player and a second media player download and play back Content A (e.g., a movie having a corresponding content identifier value of CID-A) and Content B (e.g., a movie having a corresponding content identifier value CID-B). In this example, assume that both content A and content B happen to be published by Publisher X. Further assume that the first media player and second media player generate respective log reports based on playback of Content A and Content B on each respective media player. During log report generation, each media player associates a different unique identifier value with the publisher. For example, assume that the first media player associates the unique identifier value Y with publisher X and that the second media player associates the unique value Z with publisher X.

When creating a respective log report, each of the respective media players can utilize the same content identifier values to specify the content to which the log report pertains. For example, if the first media player plays back content A the first media player can store the value CID-A in the respective log report. If the second media player plays back content A, the second media player stores the value CID-A in the respective log report. However, since each media player associates a different unique value with the publisher, the respective media players playing back the same content produce log reports with different publisher identifier values, even though the content played back happens to be from the same publisher. For example, in the above case, the first media player playing back content A stores the value Y and CID-A in a respective log report. The second media player playing back content A stores the value Z and CID-A in a respective log report.

Additionally, when the first media player plays back content B, the first media player stores CID-B as well as the value Y in the respective log report. The second media player playing back content B stores CID-B as well as the value Z in the respective log report.

Based on the embodiments above, a publisher can apply queries to the log reports (or log report information) to identify which media players are used to view the publisher's different content even though the identity of the media player creating the respective log reports remains anonymous. That is, the publisher can identify which content is viewed by the same media player or person. In the above example, based on log report information, the publisher can deduce that the log reports including the value Y were created by a given media player and that the log reports including the value Z were created by a different media player. However, because of anonymity with respect to the publisher identifier values, the publisher does not know an identity of the media players playing the content. In other words, the publisher and/or publishers do not know the particular media player that includes the value Y in the corresponding log reports or the particular media player that includes the value Z in the log reports.

In addition to the embodiments as discussed above, other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a (tangible) computer-readable medium including computer program logic encoded thereon that, when performed in a computerized device having a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained as embodiments disclosed herein.

Accordingly, one particular embodiment of the present disclosure is directed to a computer program product that includes a computer readable medium (e.g., tangible computer readable media) having instructions stored thereon for supporting operations such as content playback and generation of log reports. The instructions, when carried out by a processor of a respective computer, cause the processor to: i) initiate playback of content on a media player, ii) receive selection of a playback command applied to the content being played back by the media player; iii) based on the selection of the playback command, create an entry in a log report to indicate the selection of the playback command, and iv) initiate distribution of the log report to notify a publisher associated with the content that the playback command was selected during playback of the content on the media player. Note that the numbering (e.g., i, ii, iii, iv) of the above steps has been added for clarity sake, these steps need not be performed in any particular order.

As discussed above, techniques herein are well suited for use in content playback applications and corresponding systems. However, it should be noted that embodiments herein are not limited to use in such applications and that the techniques discussed herein are well suited for other applications as well.

Also, it is to be understood that the system, method and apparatus herein can be embodied strictly as a software program, as a hybrid of software and hardware, or as hardware alone such as within a processor, or within an operating system or a within a software application. Example embodiments of the invention may be implemented within products and/or software applications such as those manufactured by Adobe Systems, Inc. of San Jose, Calif., USA.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
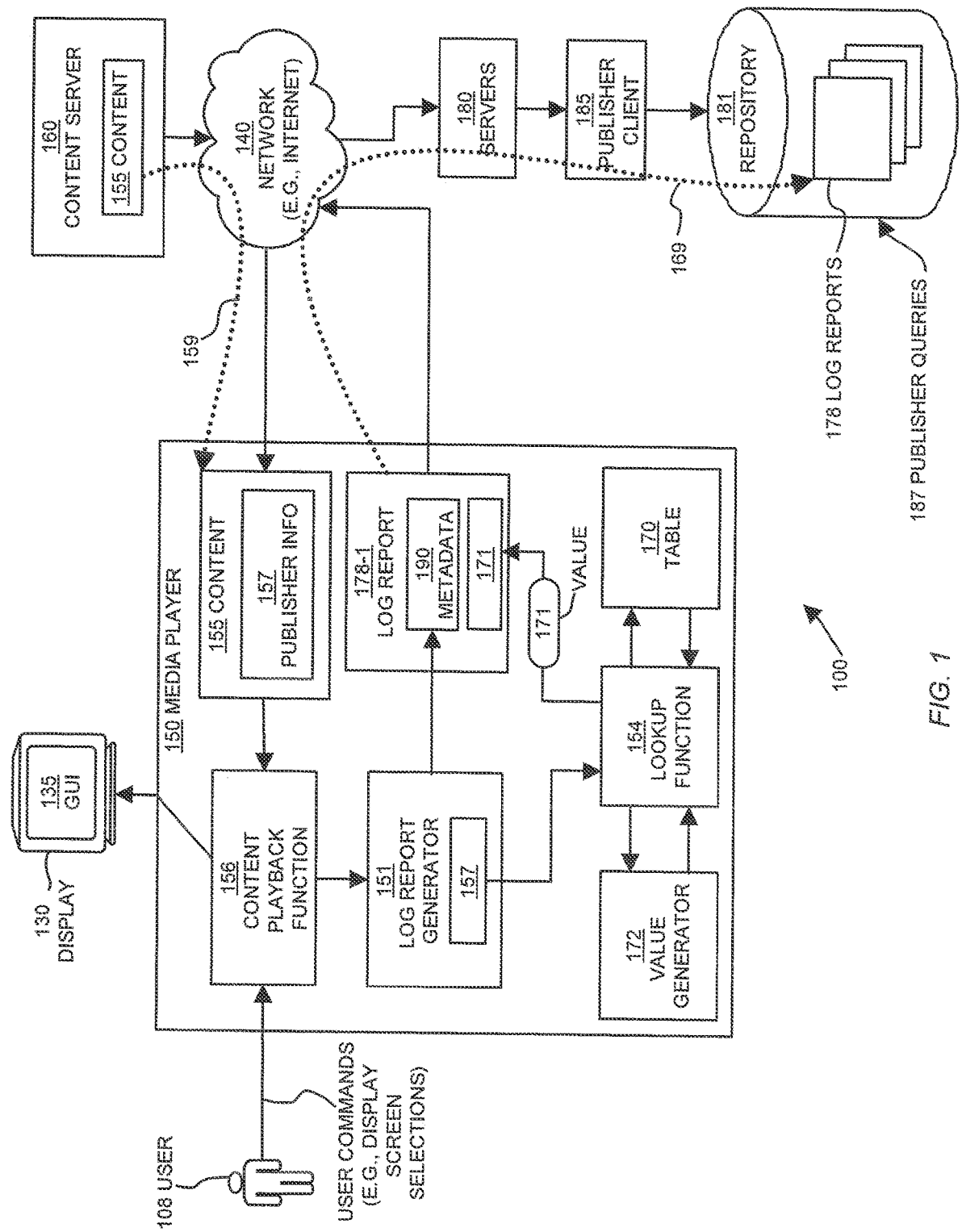
FIG. 1 is an example block diagram of a network environment illustrating use of log reports according to embodiments herein.

FIG. 1 is an example block diagram of a network environment 100 illustrating creation and use of log reports according to embodiments herein.

In the example embodiment shown, network environment 100 includes media player 150 operated by user 108, a display screen 130, network 140, content server 160, servers 180, publisher client 185, and repository 181 for storing corresponding log reports 178. Display screen 130 displays graphical user interface 130 for user 108 to view content being played back by media player 150. Media player 150 includes content playback function 156, log report generator 151, value generator 172, lookup function 154, table 170, and log report 178-1.

During general operation, the media player 150 (e.g., web browser) has access to content server 160 and servers 180 across one or more networks such as network 140 (e.g., Local Area Network "LAN", Wide Area Network "WAN", the Internet, etc.).

In response to a receiving a request for content from media player 150, content server 160 transmits requested publisher's content 155 (e.g., a playlist, movie clips, audio clips, Content Playback File "CPF", Synchronous Media Instruction Language "SMIL" file, etc.) to media player 150 over network 140 (e.g., as shown by path 159). The content 155 can include raw data and/or pointers to locations of other raw data to be retrieved and played back on media player 150.

In one embodiment, the content 155 has associated publisher information 157 such as a publisher's name or other identifier information associating the content 155 to a respective publisher. If the publisher information 157 is not included in the content 155, the publisher information 157 can be obtained from the content 155 itself or retrieved from another source such as a remote server.

One way to identify a publisher associated with content being played back is use of an "authority" section of a feed URL (e.g., a pointer received via media feed 159) that references the media content. For example, if the user is playing back an episode from NBC's Heroes television show, then the feed URL for the Heroes feed may be something like "http://www.nbc.com/heroes/feed.xml". In this case, the authority (e.g., publisher id information) is "www.nbc.com", which is the publisher identifier.

Content playback function 156 supports playback of the retrieved content 155. A source such as user 108 applies playback commands to the content 155 as it is played back on media player 150. Examples of playback commands include play, rewind, fast forward, pause, stop, etc. In one embodiment, the content playback function 156 renders the content 155 on graphical user interface (GUI) 135 of display 130 for viewing by user 108.

Prior to playback of content 155, the media player 150 can receive configuration input from a user 108. The user input indicates whether the user 108 has given the permission (or configured the media player) to create one or more log reports (e.g., log report 178-1) indicating different playback commands applied to the content 155 during playback. Enabling the user 108 to configure media player 150 prevents any privacy issues that may otherwise arise from tracking the user's habits and tendencies while viewing the content 155. In other words, according to embodiments herein, a user 108 can select a log report generation mode and/or be apprised that the media player 150 creates log reports 178 that are used by a corresponding publisher to identify which portions of content are of more interest (or less interest) to a respective viewer.

A user may elect a configuration mode in which the media player 150 does not generate corresponding log reports when viewing retrieved content. However, certain publishers may require that the user enable the media player 150 to generate the log reports in order to view their content. Otherwise, the media player 150 may be prevented from playing back such content.

As will be discussed later in this specification, by analyzing the feedback such as information in generated log reports, the publishers can, in turn, focus on publishing more desirable types of content (e.g., movies, advertisements, news information, etc.) for users. Thus, use of the log reports 178 to track viewing habits provides a benefit to both the publisher and the viewers that download such information.

As its name suggests, log report generator 151 creates (or adds information to) a corresponding log report 178-1 during playback of the content 155 by content playback function 156. For example, as the user 108 applies commands to the content 155 being played back by the media player 150, the log report generator 151 stores metadata 190 in the log report 178-1. Metadata 190 can include information such as the name of a playback command (e.g., event) applied to the content 155 being played back, a time when the event occurred, a URL associated with the content being played back, publisher information associated with played back content, etc. More particular examples of the different metadata 190 stored in log report 178-1 are shown and will be more particularly discussed with respect to FIG. 2 below.

Continuing with the example in FIG. 1 and as mentioned above, the content 155 has associated publisher information 157 indicating a particular publisher associated with the content 155 being played back by the media player 150. In addition to storing event information such as application of different playback commands to the content 155, when creating the log report 178-1, the log report generator 151 can store or include a value 171 associated with the publisher in the log report 178-1. According to one embodiment, as will be discussed later in the following paragraphs, the value 171 can be a unique value obtained or created by the media player 150 to store in a respective log report each time the user 108 initiates playback of content associated with the respective publisher.

As described herein, the media player 150 can generate value 171 as a random number (e.g., an equivalent of a browser "cookie") used to represent the client/user in relation to a publisher. The media player 150 includes the value 171 in the respective log reports to a tracking server. The value 171 can be meaningless data enabling the analytics component of the tracking server (or publisher) to determine that certain events were initiated by the same user (without knowing any specific information about that user). Thus, value 171 can be considered to be a client/end user/media player ID relative to a particular publisher.

Via use of multiple URLs, note that a publisher can make different content available for viewing by a respective user.

In addition to storing event information as metadata 190 in the log report 178-1 as discussed above, the log report generator 151 notifies (e.g., forwards) lookup function 154 of the publisher information 157 associated with the content 155 viewed by the respective user 108. As its name suggests, the lookup function 154 uses the publisher information 157 (associated with played back content 155) to lookup a corresponding value 171 associated with the publisher in table 170. In general, the lookup function retrieves the appropriate value 171 from table 170 and stores it in the log report 178-1 based on an identity of the publisher whose content is being played back on media player 150. In an example embodiment, the table 170 can include entries mapping publisher information to a corresponding unique value for each of multiple publishers.

Note that table 170 can be populated with new mapping information such as publisher identifier values as media player 150 retrieves and plays back content. For example, if the lookup function 154 determines that table 170 does not yet have a corresponding value 171 for the given publisher associated with content 155, the lookup function 154 uses value generator 172 to create or generate a corresponding value 171 for the publisher.

In one embodiment, the value generator 172 is a random number generator function that produces a unique multi-bit value and associates such a value 171 to the given publisher.

Note that as an alternative to generating the value 171 locally such as via a local random number generator, the media player 150 can obtain the unique value 171 associated with the publisher from a source other than the value generator 172 for storage in the table 170.

Each time the log report generator creates a log report 178-1 based on playback of content by the publisher, the log report generator 151 and/or look-up function 154 initiates storage of the publisher's unique identifier value in the corresponding log report 178.

Based on a triggering event such as termination of viewing the retrieved content 155 on media player 150, the media player 150 initiates transmission of the log report 178-1 (and other log reports that are generated over time as user 108 retrieves and views different content with media player 150) to one or more servers 180. Thus, according to one embodiment herein, the media player 150 (e.g., via log report generator 151) initiates distribution of respective log reports after the user 108 has terminated their viewing of the content 155 on the media player 150.

A specified one of servers 180 store the received log report 178-1 as well as other log reports 178 from media player 150. Such a server can be configured to store other log reports created and sent by other media players present in network environment 100.

As discussed above, servers 180 enable respective publishers to retrieve the log reports 178 for purposes of analyzing the different playback commands applied to the content 155 during respective playback. For example, a publisher client 185 can access the log reports 178 stored in server 180 for storage of the retrieved log report information in repository 181 such as a database. Thus, in one embodiment, servers 180 are configured to distribute the log reports and/or corresponding playback information to the appropriate publishers. That is, log reports 178 generated in response to playback of content associated with publisher A are made available to publisher A, log reports 178 generated in response to playback of content associated with publisher B are made to publisher B, and so on.

Based on the above discussion, path 169 thus illustrates an example transfer of a given log report 178-1 and its corresponding contents from media player 150 to repository 181.

After storage of the log report information in repository 181, the respective publisher can submit or apply queries (e.g., Structured Query Language queries applied to the log report information stored in repository 181) to identify which portions of content viewed on respective media players are more or less appealing to viewers. For example, the publisher can submit a query to retrieve stored log report information associated with playback of specific content.

One way for a publisher to identify relevant log reports for given content played back on media players is to perform a search for any log reports 178 having identifier information (e.g., a URL of the content 155) associated with content 155 being analyzed. Recall that the log report generator 151 can include a content identifier value of played back content as metadata 190 in the respective log reports 178. Thus, via use of a search term such as a content identifier value, the publisher can search the available log reports to identify any log report information generated as a result of a user viewing specific content.

After identifying a relevant set of log report information for given content played back by one or more media players, the publisher analyzes the log report data. If log report information in such a set indicates a trend that many viewers watching the same content initiate a fast forward command in the same relative location of played back media (e.g., a video clip, audio clip, advertisement, news clip, movie, episode, etc.), then the publisher can deduce that the given portion of video "skipped" by the viewers is less desirable. On the other hand, if multiple log reports 178 by one or more viewers indicate a trend that many viewers watching the same content initiate a rewind and playback command in the same relative location of a video to view the same section of media again, then the publisher can deduce that the given portion of "replayed" media (e.g., an advertisement, news clip, movie, episode, etc.) is more desirable to viewers.

As discussed above, the media player 150 can play back content associated with a single publisher for display on display screen 130. In further embodiments, note that the media player 150 can be configured to simultaneously playback content for multiple publishers at the same time. For example, the media player 150 can initiate playback of publisher A content (e.g., advertising banner) on a first portion of graphical user interface 135, while playing back publisher B content (e.g., a news segment) on a second portion of graphical user interface 135. Playback commands can be applied to both or either of publisher A's content or publisher B's content. In such an embodiment, the media player 150 can create two log reports: a first log report and a second log report, each of which stores the playback commands applied by a respective user 108 during playback of both publisher's content. Upon occurrence of a triggering event such as termination of viewing the content, the media player 150 initiates transmission of a first log report (for publisher A) and a second log report (for publisher B) over network 140 to servers 180.

In one embodiment, a single server is used to store log reports for different publishers. In other embodiments, a each of multiple servers stores log reports for a respective publisher.

The tracking solution as described herein can support distribution of the log reports in accordance with information provided by the publisher. For example, as discussed above, a publisher can make a media feed available for a user to retrieve and view content. The media feed can include a pointer value (e.g., a URL) of a tracking server (e.g., one of servers 180) to which the log reports are sent. Based on this pointer value, the media player 150 sends the log reports for the corresponding media feed to the tracking server listed in the feed.

In yet another embodiment, multiple publishers can have log reports sent to the same tracking in a case where the tracking server is owned or operated by a common publishing solution company (i.e., one in which publishers would contract with to handle their publishing and tracking needs).

In accordance with the embodiments as discussed above, a combination of the media player 150 and the servers 180 enable distribution of the first log report to publisher A and distribution of the second log report to publisher B. As an alternative, the media player 150 can create a single log report that is made available to both publisher A and publisher B.

Also, as discussed above, the media player can present a respective user 108 with an option of whether or not the media player 150 is enabled to create log report information that is fed back to respective publishers. In further related embodiments, the content playback function 156 can (graphically) present a user 108 of the media player 150 with multiple tracking options including a first tracking option and a second tracking option. Selection of the different tracking options can enable and disable the feature of including a respective publisher identifier value in a corresponding log report.

For example, according to a selected first tracking option, the media player 150 creates log reports including issued playback commands but without the value 171 associated with the publisher. According to a selected second tracking option, the media player 150 creates log reports including issued playback commands as well as a corresponding value 171 associated with the publisher. In the latter embodiment (e.g., when second tracking option is enabled), the generated log reports include values and, thus, a respective publisher can analyze the log report information to identify which content is viewed by the same media player. On the other hand, in the first embodiment when the first tracking option is enabled, the generated log reports do not include the values 171 associated with publishers and, thus, the publisher cannot analyze the log report information to identify which content is viewed by the same media player.

In yet further embodiments, the media player 150 and corresponding servers 180 can be configured to provide security with respect to the generated log reports 178 transmitted over network 140 to servers 180 and publisher 185. For example, the media player 150 can provide security with respect to the log report by encrypting the generated log reports and/or placing the log reports in a location that is inaccessible or difficult to access by the user 108. This can prevent or at least deter the user 108 associated with the media player 150 from tampering with log reports. When encryption is used, the servers 180 can have a corresponding decryption key to decrypt the received log reports.

In yet another embodiment, the media player initiates sending log reports 178 over network 140 without encrypting the data. For example, the media player 150 encrypts the data (e.g., log reports and related information) on the client computer system so that the user 108 cannot tamper with the generation of log reports. This prevents the user 108 from changing the playhead time for a particular event to a different value, adding fake events, removing valid events, etc. A decryption key can be stored on the client computer system so that the media player 150 can decrypt the log reports prior to transmission over network 140. Accordingly, the publisher can receive the log reports unencrypted.

It is possible that the user 108 views retrieved content while offline (e.g., a condition in which the media player 150 does not have access to or is currently unable to use a network connection to communicate over network 140 with servers 180). In such an instance, the media player 150 can create log reports as a respective user 108 views corresponding content. Eventually, when the media player 150 is back on-line, the media player 150 can initiate transmission of the one or more generated log reports 178 over network 140 as bandwidth or resources are available to communicate with servers 180.

Figure 2:
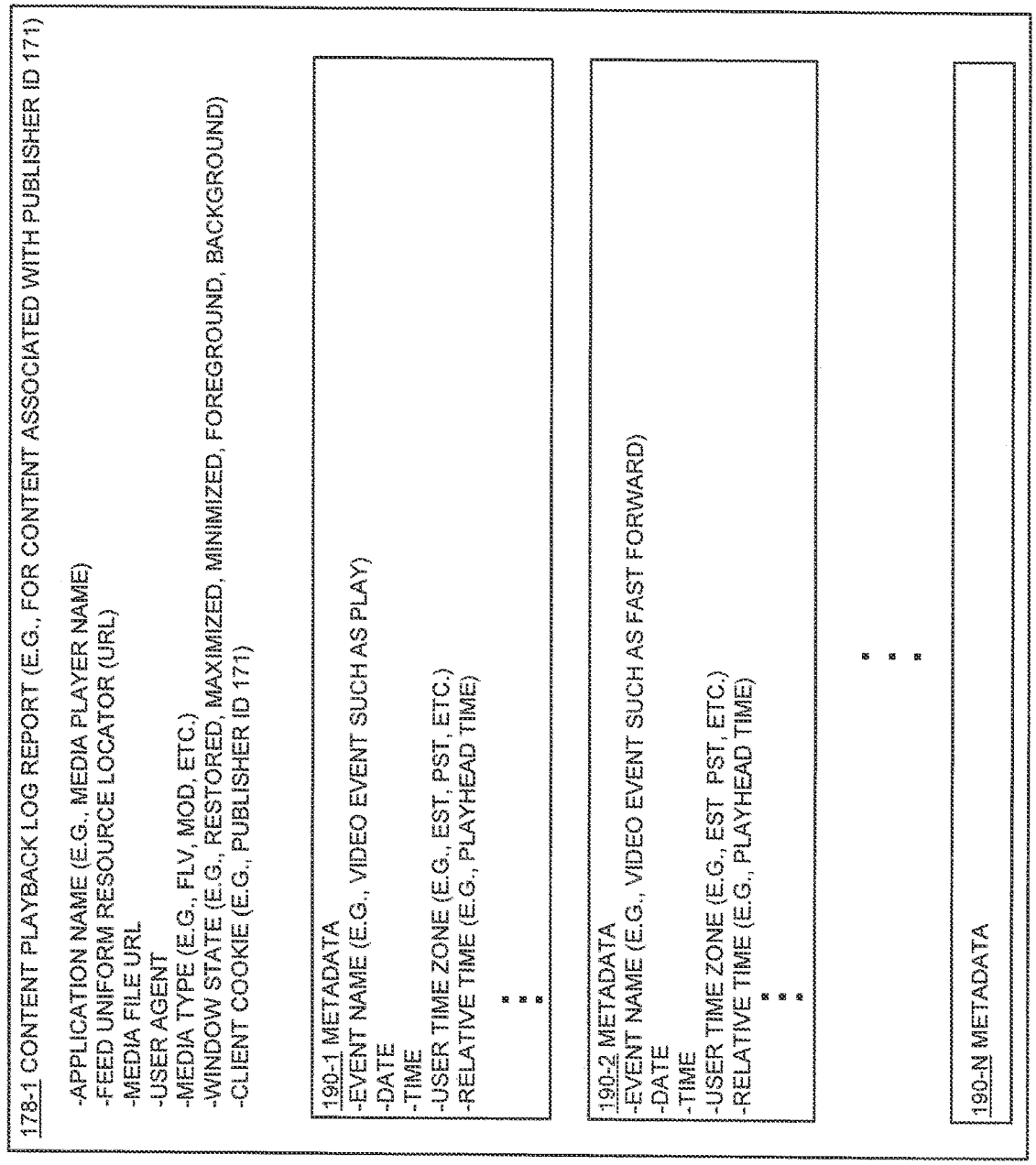
FIG. 2 is an example template of a log report including corresponding metadata according to embodiments herein.

FIG. 2 is an example log report 178 according to embodiments herein. As shown, the media player 150 creates each of multiple respective log reports 178 to include information associated with playback of corresponding content. For example, the log report 178-1 can include information specifying the media feed URL (e.g., pointer to a Really Simple Syndication "RSS" media feed on which the content was obtained), a media file URL (e.g., a pointer to a location of media content such as a Flash Video ".flv" file or Media Orchestration Descriptor ".mod" file played back by the media player), etc.

Based on information in a log report such as a pointer value identifying a location or description of the content being played back, the servers 180 can identify to which publisher the log report pertains and initiate distribution of the log reports to the corresponding publisher.

Referring still to the example embodiment of FIG. 2, the User Agent information stored in the log report represents a string of data information identifying the type of application creating and transmitting the log report 178-1. Additionally, the media type information indicates the type of file (e.g., file type extension such as ".mod" file, ".flv" file, . . . ) being executed to playback the corresponding content.

A log report can also include window state information. The window state information stored in the log report indicates the state of the media player 150 during occurrence of a detected event such as a playback command. For example, the window state information can specify whether the graphical user interface 150 used to view the content was minimized, maximized, restored, in the foreground of display 130, in the background of display 130, etc. at a time when the event occurred. Based on such information, a respective publisher can identify an extent to which a respective user was paying attention to viewing of the played back media.

One window state that can be included in the log report is whether a user views the content in a "full screen" mode, which is similar to maximized window except the media player application displayed as graphical user interface 135 covers the entire display screen. When viewing media in the full screen mode on a computer system operating Windows, the taskbar is no longer visible. On a computer system such as a Macintosh computer, this means the dock is no longer visible.

Log report also can include a "client cookie" or unique value 171 associated with the publisher of the content 155 as discussed above. The value 171 is a unique value (associated with the publisher) used by the media player 150 to include respective log reports generated as a result of playing back content for a given publisher.

In addition to the general information included in the log report 178-1 as mentioned above, each log report can include further information associated with playback of content. For example, each log report can include event information as specified in the log report 178 as metadata 190 (e.g., 190-1, 190-2 . . . 190-N).

As shown, the metadata 190 stored in log report 178-1 describes attributes associated with detected events (e.g., commands applied to the content being played back). The attributes can include parameter information such as the event name, a time and date when the event occurred, the user's time zone (e.g., eastern standard time, central standard time, pacific standard time, . . . ), a relative location in the media where or when the event occurred, etc. In one embodiment, the relative time information stored in the log report 178 represents a playhead position in the media player that points to a specific instance in the content 155 where the event occurred.

Detected events can include play, pause/unpause, stop, complete (e.g., the video ends), connect/disconnect (e.g., related to streamed content), mute/unmute, set volume, enter/exit full-screen, skip to next (e.g., go to next video clip), skip to previous (e.g., go to previous video clip), etc.

Note that use of log reports can be expanded beyond the scope as discussed above. For example, log reports can be generated based on detected activity with respect to media feeds (e.g., RSS feeds) such as those used to receive notification of updates with respect to available content. In such an embodiment, the metadata 190 included in a respective log report can represent an occurrence of a feed event having certain metadata attributes such as Date, Time, Application Name, Feed URL, etc. Feed events typically occur during aggregation of media feeds (e.g., via an RSS aggregator) and can include events such as subscribe/unsubscribe, check for update, check for update complete, download start, download paused, download resumed, download completed, download error, etc.

In yet further embodiment, note that one or more media players can be configured to produce a log report of a combination of different types of information such as detected events associated with a corresponding one or more media feed as well as detected events (e.g., issued playback commands) associated with playback of content. That is, a log report 178-1 can include metadata for both media commands (e.g., play, stop, pause, fast forward, rewind, etc.) and feed events (e.g., subscribe/unsubscribe, check for update notification, check for update complete, download start, download paused, download resumed, download completed, etc.). Thus, via a single log report, publishers of content can track user and media player interaction.

Note that the events recorded in the log report need not be restricted to user-generated events. In other words, the media player 150 can also trigger the log report generator 151 to create an entry in log report 178-1 based on local and/or remote computer-generated events.

Figure 3:
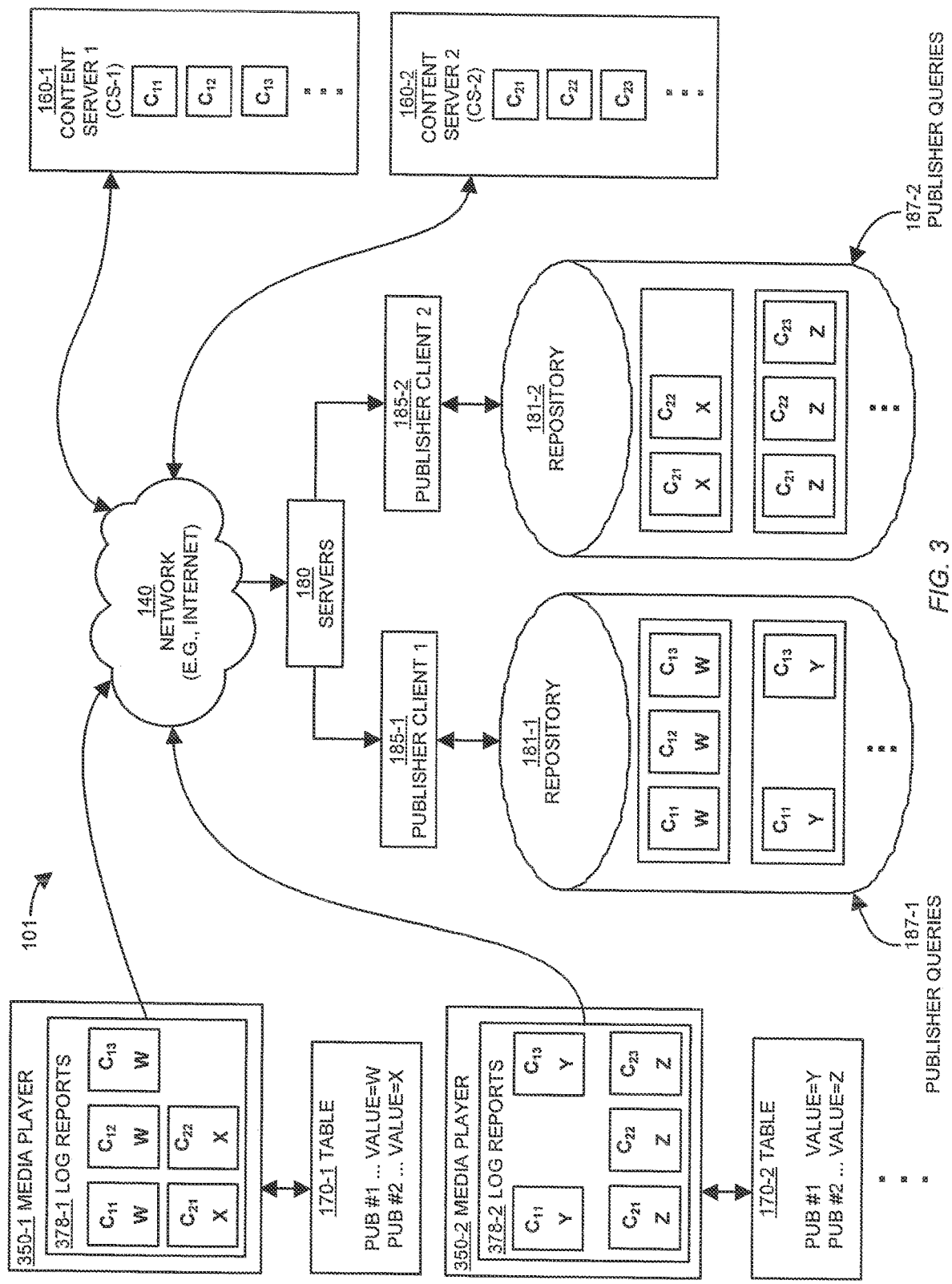
FIG. 3 is an example block diagram of a network environment illustrating distribution of log reports from multiple media players and use of the log reports by publishers according to embodiments herein.

FIG. 3 is an example block diagram of a network environment 101 illustrating creation, distribution, and use of log reports 178 from multiple media players 350 according to embodiments herein.

In general, FIG. 3 illustrates how different media players use different publisher identifier values to create corresponding log reports. For example, from the perspective of a given media player creating a log report, the respective value 171 associated with the publisher can indicate the publisher whose corresponding content is being played back by the respective media player. Note that the values 171 used by the media players for the publishers can be maintained in secrecy (e.g., not distributed from the media players to the publishers) so that the publisher cannot identify which media player happens to playback the corresponding content as specified by the log report. However, as will be discussed below, since each media player stores the same "anonymous" values associated with a given publisher in different log reports when playing back content by the same publisher, the corresponding publisher can use the publisher identifier value information in the log reports to identify which content happens to be viewed by the same media player.

More specifically, in the example embodiment shown, network environment 101 includes media player 350-1 and media player 350-2 (wherein the vertical ellipsis indicates other possible media players), network 140, content server 160-1 (CS-1), content server 160-2 (CS-2), servers 180, publisher client 185-1, publisher client 185-2, and respective repository 181-1 and repository 181-2 for storing corresponding log report information (e.g., from log reports 178-3 and 178-4), respectively. Media players 350-1 and 350-2 include respective tables 170-1 and 170-2.

Content server 160-1 and content server 160-2 contain respective content $C_{11}$, $C_{12}$, $C_{13}$, . . . and $C_{21}$, $C_{22}$, $C_{23}$, . . . for distribution over network 140 and playback by media players 350.

Note that the first subscript number, i, in the content identifier format $C_{ik}$ corresponds to the publisher from which the content originated. The second subscript number, k, in the content identifier format $C_{ik}$ corresponds to the different content associated with the respective publisher. Thus, content $C_{11}$ corresponds with first content made available by publisher #1; content $C_{12}$ corresponds with second content made available by publisher #1; content $C_{23}$ corresponds with third content associated with publisher #2; and so on.

Assume in this example that media player 350-1 plays back content $C_{11}$, $C_{12}$, $C_{13}$ retrieved from content server 160-1 as well as content $C_{21}$ and $C_{22}$ retrieved from content server 160-2. Likewise, assume in this example that media player 350-2 plays back content $C_{11}$ and $C_{13}$ retrieved from content server 160-1 associated with as content $C_{21}$, $C_{22}$, $C_{23}$ retrieved from content server 160-2.

Based on playback of such content, the corresponding media players 350 produce respective sets of log reports 378 (e.g., log reports 378-1 and log reports 378-2) in a manner as discussed above. For example, media player 350-1 creates five corresponding log reports as a result of playing back content $C_{11}$, $C_{12}$, $C_{13}$, $C_{21}$ and $C_{22}$. Media player 350-2 creates five corresponding log reports as a result of playing back content $C_{11}$, $C_{13}$, $C_{21}$, $C_{22}$ and $C_{23}$.

Each log report can specify the corresponding content to which the report pertains. Additionally, each log report can include a corresponding media player's unique value 171 for the given publisher. In this example, assume that media player 350-1 uses unique value W with the publisher #1 to include in log reports associated with playback of content made available by publisher #1 and that media player 350-1 uses unique value X associated with publisher #2 to include in log reports associated with playback of content made available by publisher #2. Further assume that media player 350-2 uses unique value Y associated with publisher #1 to include in log reports associated with playback of content made available by publisher #1 and that media player 350-2 uses unique value Z associated with publisher #2 to include in log reports associated with playback of content made available by publisher #2.

Media players 350 include respective tables 170 (e.g., table 170-1 and table 170-2) to store respective mappings of publisher identifier value information.

The following is an example illustrating how each media player creates the different log reports.

The first log report created by media player 350-1 indicates that media player plays back content $C_{11}$. In addition to including $C_{11}$ in the first log report, the media player 350-1 includes value, W, because the content played back is associated with publisher #1.

The second log report created by media player 350-1 indicates that media player 350-1 plays back content $C_{12}$. In addition to including value $C_{12}$ in the second log report, the media player 350-1 includes value, W, because the content played back is associated with publisher #1.

The third log report created by media player 350-1 indicates that media player 350-1 plays back content $C_{13}$. In addition to including value $C_{13}$ in the third log report, the media player 350-1 includes value, W, because the content played back is associated with publisher #1.

The fourth log report created by media player 350-1 indicates that media player 350-1 plays back content $C_{21}$. In addition to including value $C_{21}$ in the fourth log report, the media player 350-1 includes value, X, because the content played back is associated with publisher #2.

The fifth log report created by media player 350-1 indicates that media player 350-1 plays back content $C_{22}$. In addition to including value $C_{22}$ in the fifth log report, the media player 350-1 includes value, X, because the content played back is associated with publisher #2.

In furtherance of the present example, the first log report created by media player 350-2 indicates that media player plays back content Cu. In addition to including $C_{11}$ in the first log report, the media player 350-2 includes value, Y, because the content played back is associated with publisher #1.

The second log report created by media player 350-2 indicates that media player 350-2 plays back content $C_{13}$. In addition to including value $C_{13}$ in the second log report, the media player 350-2 includes value, Y, because the content played back is associated with publisher #1.

The third log report created by media player 350-2 indicates that media player 350-2 plays back content $C_{21}$. In addition to including value $C_{21}$ in the third log report, the media player 350-2 includes value, Z, because the content played back is associated with publisher #2.

The fourth log report created by media player 350-2 indicates that media player 350-2 plays back content $C_{22}$. In addition to including value $C_{22}$ in the fourth log report, the media player 350-2 includes value, Z, because the content played back is associated with publisher #2.

The fifth log report created by media player 350-2 indicates that media player 350-2 plays back content $C_{23}$. In addition to including value $C_{23}$ in the fifth log report, the media player 350-2 includes value, Z, because the content played back is associated with publisher #2.

As discussed above, note again that each of the log reports also includes metadata indicating commands applied during playback of respective content.

The respective media players 350 initiate transmission of the log reports over network 140 to one or more of servers 180 that, in turn, distribute the log report information to respective publishers for analyzing. Thus, after distribution, repository 181-1 stores log report information associated with playback of publisher #1 content and repository 181-2 stores log report information associated with playback of publisher #2 content.

Corresponding publishers apply queries with respect to the log report information stored in repositories 181. For example, a publisher #1 associated with content available on server 160-1 submits publisher queries 187-1 with respect to repository 181-1 in order to identify trends such as which portions of played back media are more or less interesting to a respective viewers. Similarly, publisher #2 submits publisher queries 187-2 to repository 181-2 in order to identify trends such as which portions of played back media are more or less interesting to respective viewers.

In addition to identifying which media is most desirable to a respective viewer, content publishers can obtain and utilize the log report information to identify which media players 350 are used to play back content from the same publisher, without revealing the identities of the media players 350. In other words, according to one embodiment, a given publisher can query a respective repository 181 to identify log reports having the same value 171. The publisher cannot determine which media player played back the publisher's content. Based on log reports having the same value 171, the publisher can identify which of the publisher's respective content was played back by the same media player.

For example, based on queries to repository 181-1, publisher #1 can identify that respective log reports generated as a result of viewing of content $C_{11}$, $C_{12}$, and $C_{13}$ have the same value of W. This indicates that the same media player played back content $C_{11}$, $C_{12}$, and $C_{13}$. Since the publisher is not aware of which media player uses the value W to include in corresponding log reports, the publisher is unaware of the identity of the media player or corresponding user. Thus, use of unpublished value 171 information used by the different media players maintains the anonymity of the corresponding user and media player, while providing the respective publishers access to valuable feedback indicating how a user interacted or applied commands to different content.

In yet other embodiments, based on user consent, note that the values 171 associated with a media player can be "published" or made available such that the publisher can identify which media player happens to playback given content. In such an embodiment, the publisher can utilize the feedback (e.g., applied playback commands) to identify which content is most desirable to the user. Based on such a determination, and upon distribution of future content to the media player, the publisher can include more relevant advertisements for viewing by the user.

Figure 4:
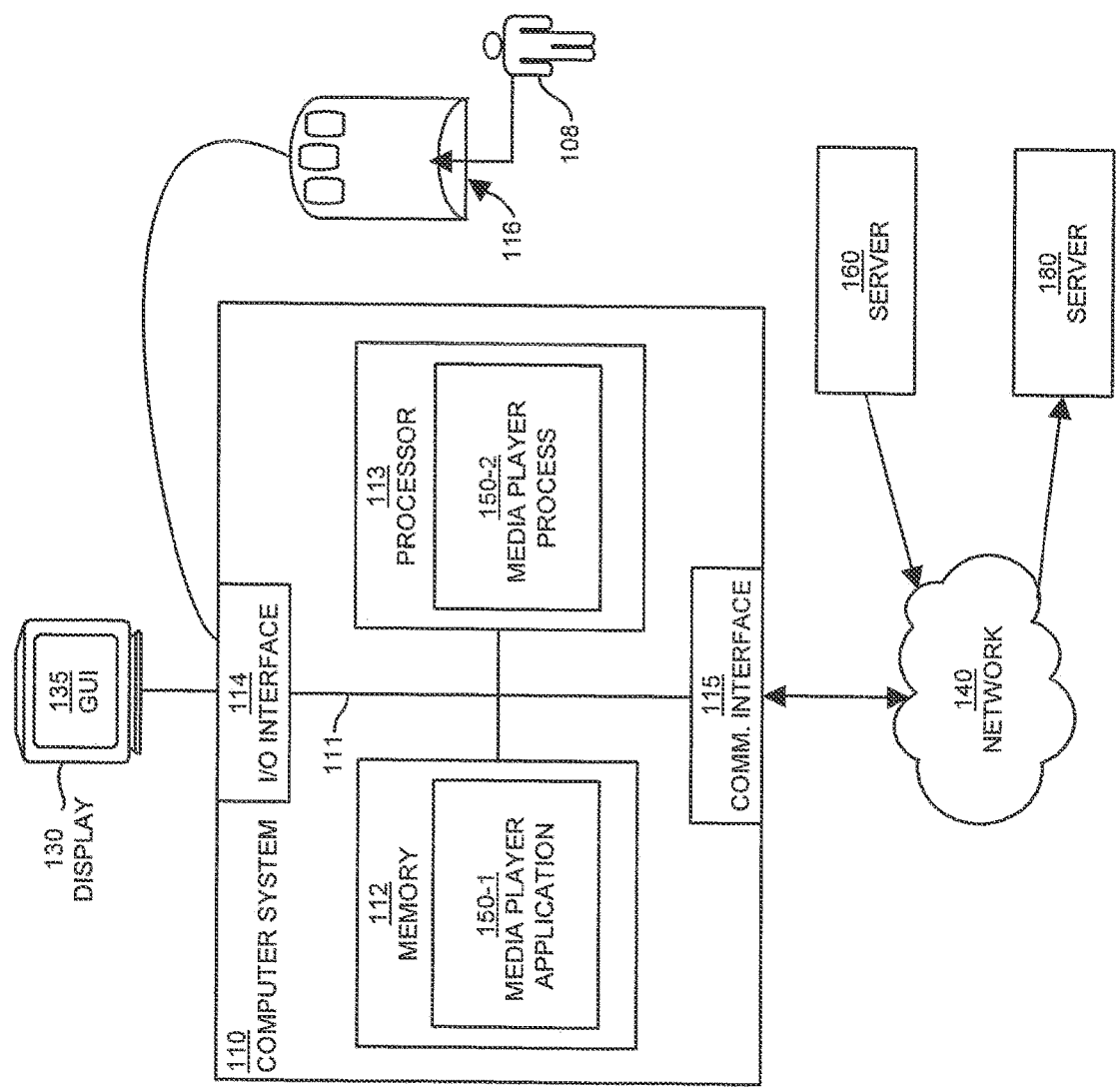
FIG. 4 is an example block diagram of a computer system configured with a media player application and process according to embodiments herein.

FIG. 4 is a block diagram illustrating example architecture of a computer system 110 (e.g., client system 120) that executes, runs, interprets, operates or otherwise performs a media player application 150-1 and/or media player process 150-2 according to embodiments herein. As previously discussed, media player 150 can be configured to support functionality associated with a content playback function 156, log report generator 151, lookup function 154 and value generator 172, as well as other functionality as described herein. The computer system 110 may be any type of computerized device such as a personal computer, workstation, portable computing device, console, laptop, network terminal, client, etc.

As shown in the example of FIG. 4, the computer system 110 includes an interconnection mechanism 111 such as a data bus or other circuitry that couples a memory system 112, a processor 113, an input/output interface 114, and a communications interface 115. An input device 116 (e.g., one or more user/developer controlled devices such as a pointing device, keyboard, mouse, etc.) couples to processor 113 through I/O interface 114, and enables a user 108 to provide input commands. The communications interface 115 enables the computer system 110 to communicate with other devices (e.g., publisher content 160 and servers 180) over a respective a network 140 (e.g., a LAN, the Internet, WAN, etc.).

The memory system 112 can generally be any type of computer readable media (e.g., tangible computer readable media) encoded with a media player application 150-1. The media player application 150-1 may be embodied as software code such as data and/or logic instructions (e.g., code stored in the memory or on another computer readable medium such as a removable disk) that supports processing functionality according to different embodiments described herein.

During operation of the computer system 110, the processor 113 accesses the memory system 112 via the interconnect 111 in order to launch, run, execute, interpret or otherwise perform the logic instructions of the media player application 150-1. Execution of media player application 150-1 in this manner produces processing functionality in a media player process 150-2. In other words, the media player process 150-2 represents one or more portions of runtime instances of the media player application 150-1 (or the entire application 150-1) performing or executing within or upon the processor 113 in the computerized device 110 at runtime.

It should be noted that the servers as discussed above can be configured to operate on a computer system in a similar way as discussed above for the media player 150. For example, the server can be a process and/or computer code encoded on tangible computer readable media. FIGS. 5-10 include flowcharts according to embodiments herein. Each step denotes one or more computer software instructions or groups of instructions that carry out such functionality. The flow diagrams do not necessarily depict the syntax of any particular programming language. Rather, the flow diagrams illustrate the functional information one of ordinary skill in the art could use to fabricate hardware circuits or to generate computer software (or a hybrid of both hardware circuits and software code) to carry out the features as described herein.

It should be noted that many routine program elements, such as initialization of loops and variables and the use of temporary variables are inherent in the flowcharts. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 5:
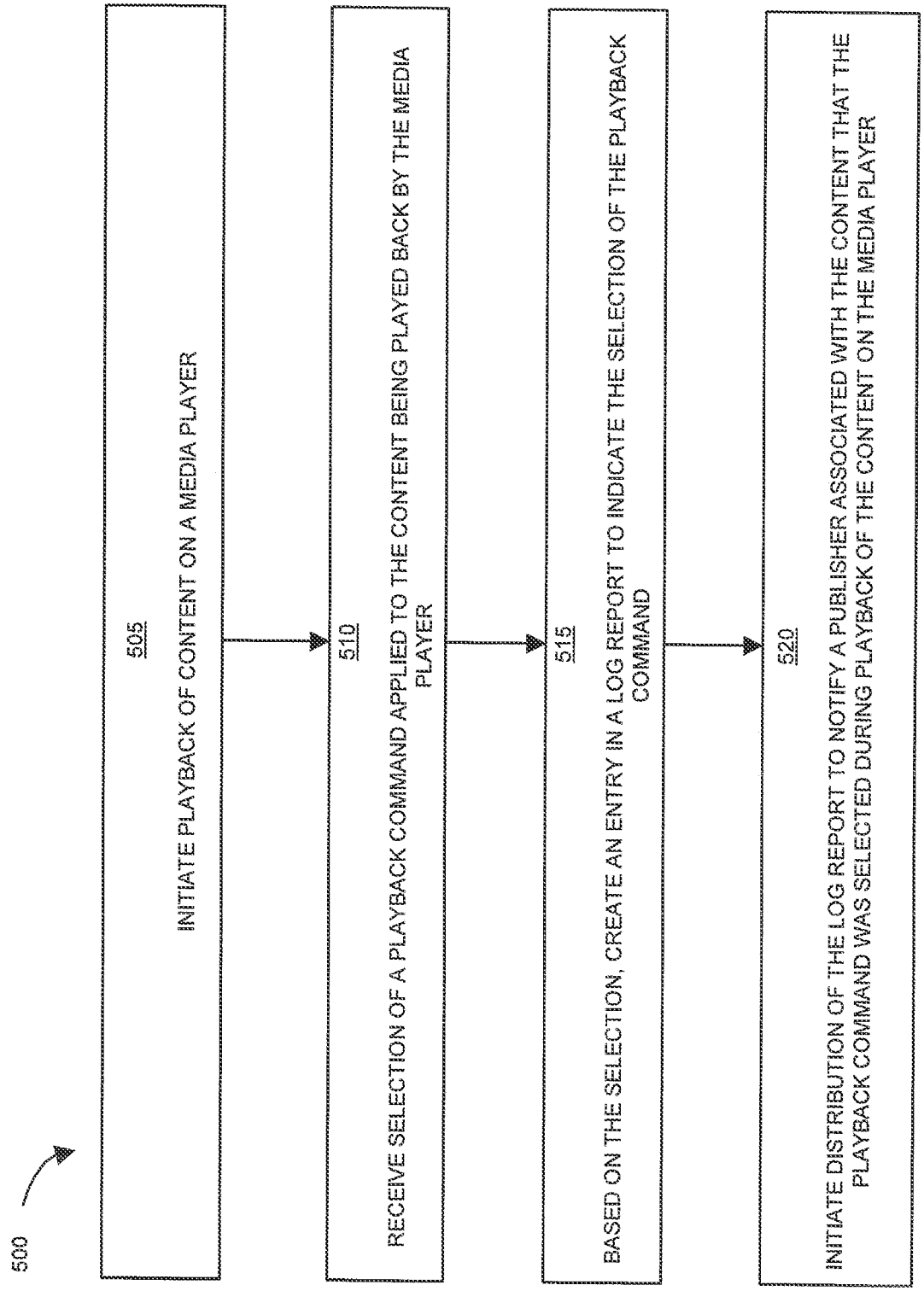
FIG. 5 is an example flowchart of processing steps associated with a media player according to embodiments herein.

Now, more specifically, FIG. 5 is a flow chart 500 of processing steps that shows processing operations performed by the media player 150 in accordance with one example embodiment.

In step 505, the media player 150 initiates playback of content 155 on a media player 150.

In step 510, the media player 150 initiates playback of content 155 on a media player 150.

In step 515, based on the selection, the media player 150 creates an entry in a log report 178-1 to indicate the selection of the playback command. For example, metadata 190-1 in the log report 178-1 of FIG. 2 represents an entry in a log report (e.g., video event and/or feed event).

In step 520, the media player 150 initiates distribution of the log report 178-1 to notify a publisher associated with the content (e.g., publisher client 1 185-1) that the playback command was selected during playback of the content 155 on the media player 150. According to one example embodiment, the media player 150 distributes the log report 178-1 to a central location (e.g., one of servers 180). In turn, the central location (e.g., specified on of servers 180) redistributes the log report 178-1 to the publisher associated with the content 155.

Figure 6:
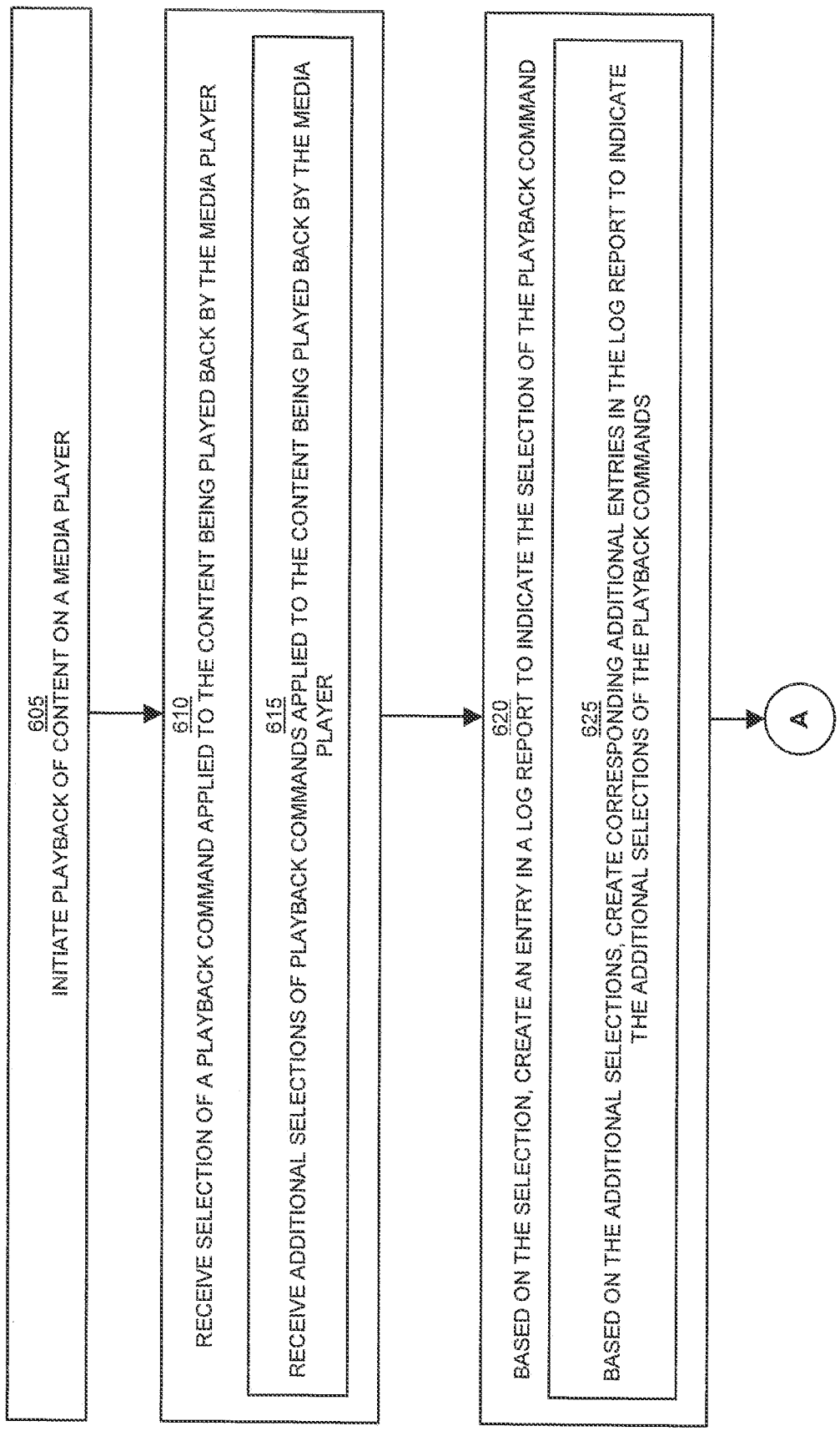
FIGS. 6-8 combine to form an example flowchart of processing steps associated with a media player according to embodiments herein.
Figure 7:
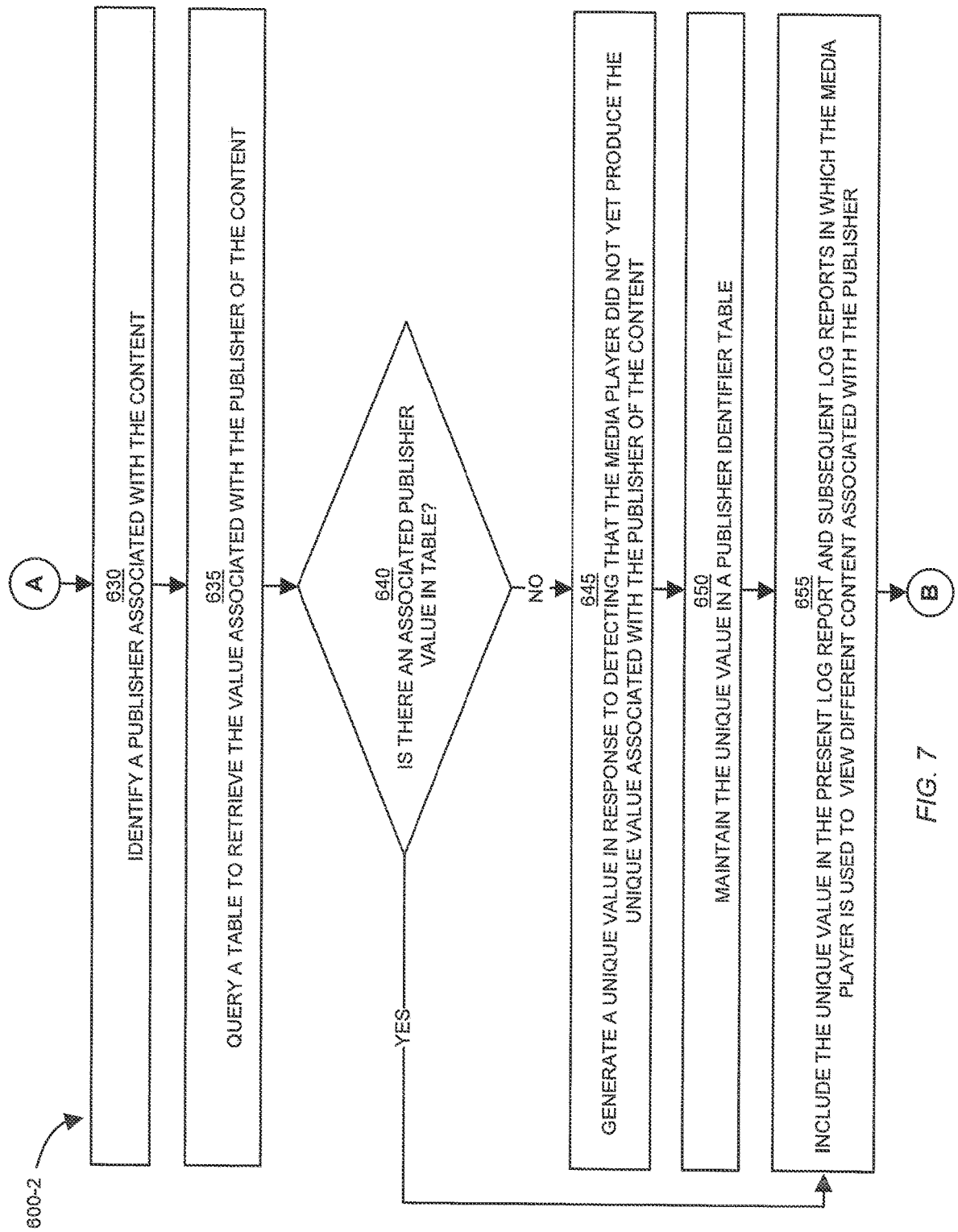
Figure 8:
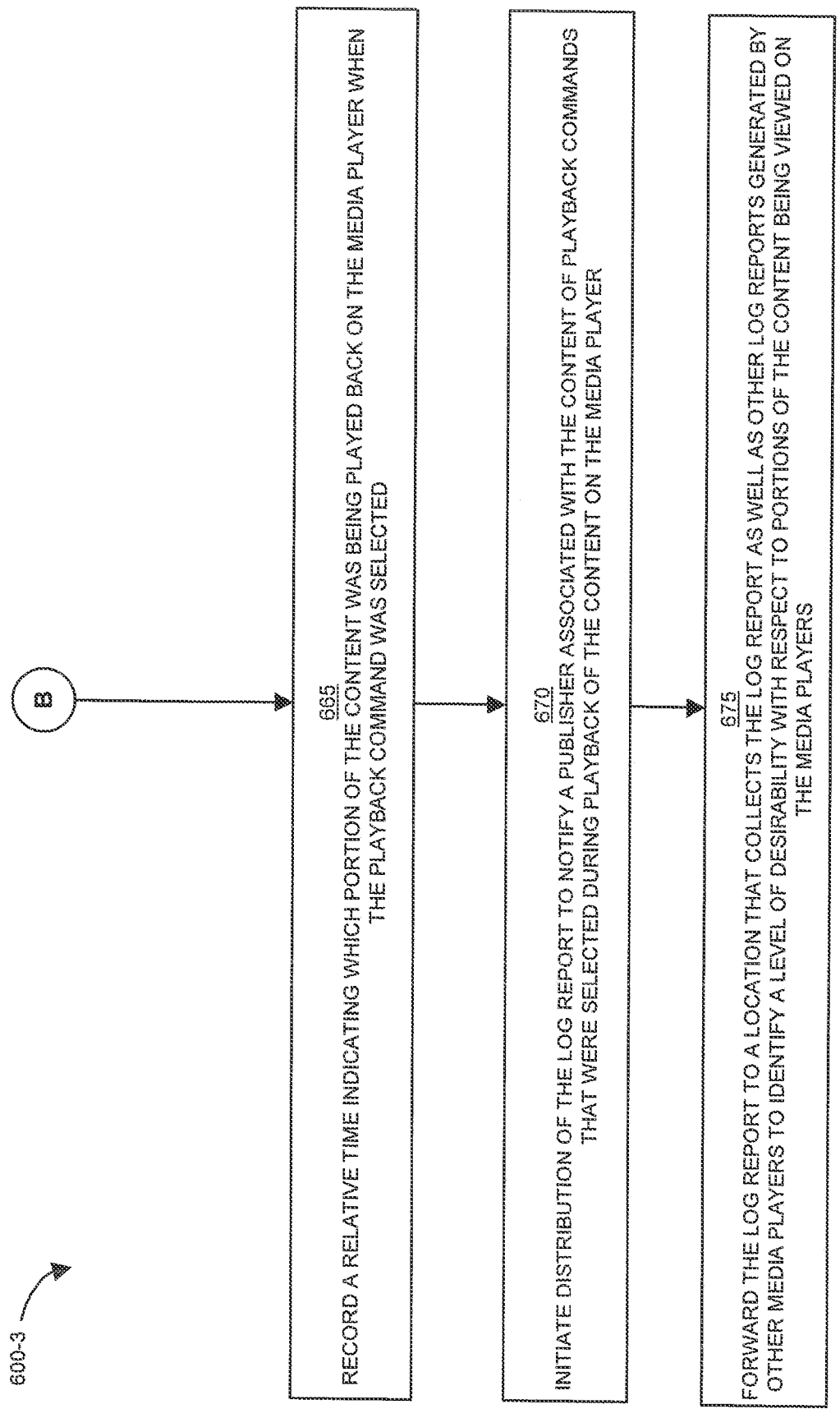

FIGS. 6, 7 and 8 combine to form a flow chart 600 (e.g., flowchart 600-1, flowchart 600-2, and flowchart 600-3) of processing steps that shows processing operations performed by the media player 150 in accordance with one example embodiment.

In step 605, the media player 150 initiates playback of content 155. FIG. 1 shows media player 150 initiating playback of content 155 via content playback function 156. Content playback function 156 renders playback of content 155 in graphical user interface 135 on display 135.

In step 610, the media player 150 receives selection of a playback command (e.g., play, stop, pause, etc.) applied to the content 155 being played back by the media player 150. The commands can be received based on input from user 108 or other source.

In step 615, the media player 150 receives additional selections of playback commands (e.g., pause, stop, fast forward, rewind, etc.) applied to the content 155 being played back by the media player 150. As shown in the example embodiment of FIG. 1, the content playback function 156 receives the selection of one or more playback commands from user 108.

In step 620, based on the selection, the media player 150 creates an entry in a log report 178-1 to indicate the selection of the playback command.

In step 625, based on the additional selections, the media player 150 creates corresponding additional entries (e.g., additional metadata entries) in the log report 178-1 to indicate the additional selections and corresponding information associated with the playback commands. For example, FIG. 2 shows additional entries in log report 178-1 represented by metadata 190-1, 190-2, . . . 190-N.

In step 630 of FIG. 7, the media player 150 identifies a publisher (e.g., publisher information 157) associated with the content 155 being played back by the media player. As previously discussed, the media player can identify the publisher by the flash video URL, feed URL, media orchestration descriptor (e.g., playlist) URL, etc.

In step 635, the media player 150 queries a publisher identifier table 170 to retrieve the value 171 associated with the publisher of the content 155 being played back on the media player.

In step 640, the media player 150 determines if there is an associated publisher value 171 in the publisher identifier table 170.

In step 645, if there is not yet a value for a given publisher in table 170, the media player 150 generates a unique value 171 in response to detecting that the media player 150 did not yet produce the unique value 171 associated with the publisher of the content 155.

In step 650, the media player 150 maintains the unique value 171 in the publisher identifier table 170.

Referring to FIG. 3, assume for steps 640 through 650 that media player 350-1 receives content $C_{12}$ from content publisher 160-1 over network 140. Further assume that media player 350-1 queries table 170-1 and determines that content $C_{12}$ does not have an associated publisher identifier 171. In response to determining the lack of an associated identifier 171 in table 170-1, media player 150 generates a unique value 171 (e.g., W) for content publisher 160-1 and maintains the new value 171 (e.g., W) in table 170-1.

In step 655, the media player 150 includes the unique value 171 in the present log report 178-1, as shown in FIG. 1. Additionally, in one example embodiment, the media player 150 includes the unique value 171 in subsequent log reports 178 in which the media player 150 is used to view different content associated with the publisher.

In step 665 of FIG. 8, the media player 150 records a relative time (e.g., playhead time or playhead position) indicating which portion of the content was being played back on the media player 155 when the playback command was selected.

In step 670, the media player 150 initiates distribution of the log report 178-1 to notify a publisher associated with the content 155 of playback commands that were selected during playback of the content on the media player 150. For example, in FIG. 1 the media player 150 distributes log report 178-1 to servers 180. In turn, servers 180 (or a specific one of servers 180) notify the publisher of the log report 178-1 having playback commands associated with the content 155 for that publisher.

In step 675, the media player 350-1 forwards the log report 178-1 to a location (e.g., a specified one of servers 180) that collects the log report 178-1 as well as other log reports (e.g., log report 178-2 in FIG. 3) generated by other media players (e.g., media players 350-2) to identify a level of desirability with respect to portions of the content being viewed on the media players 350.

Figure 9:
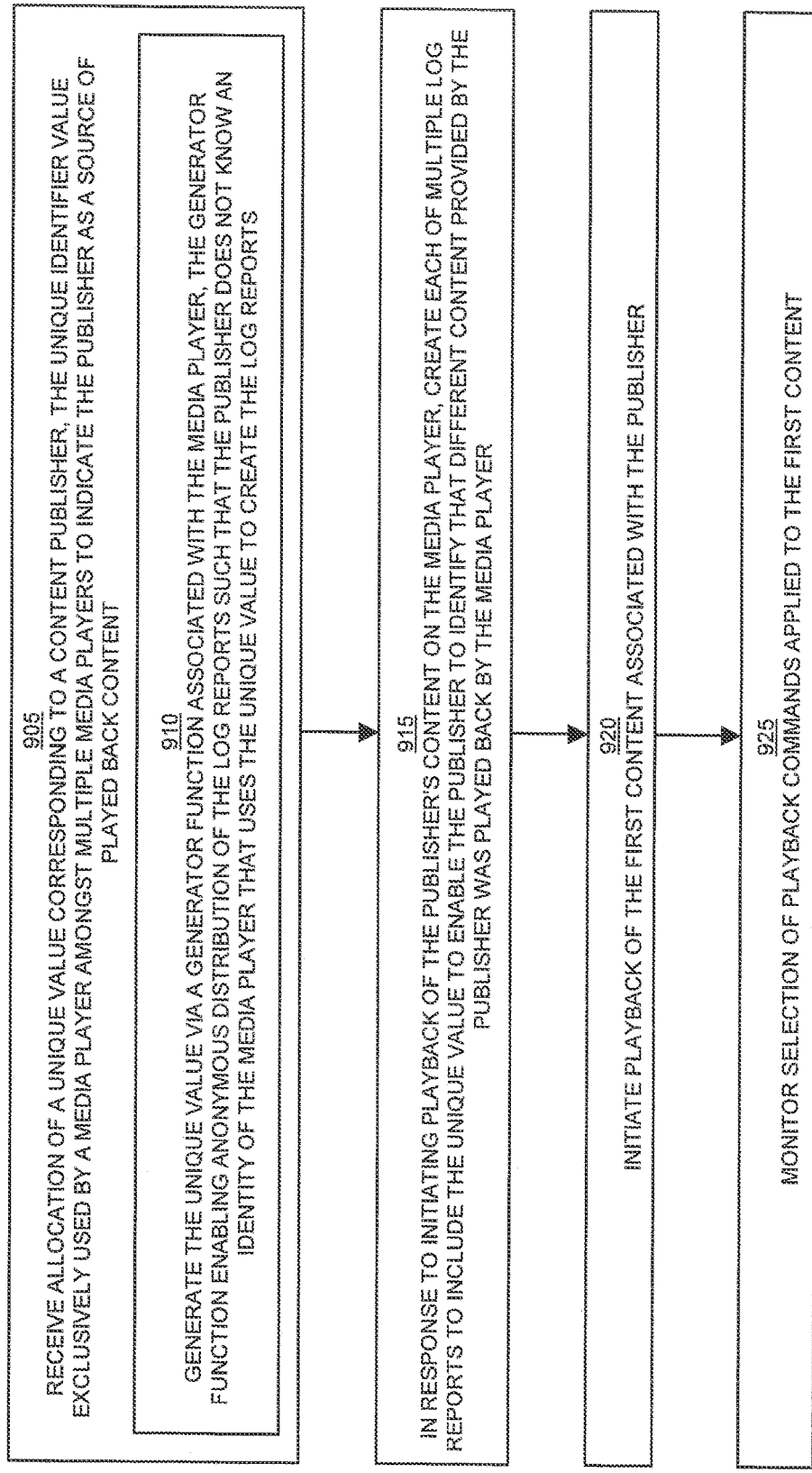
FIGS. 9 and 10 combine to form an example flowchart of processing steps associated with creation and use of log reports according to embodiments herein.

FIG. 9 is a flow chart 900-1 of processing steps that shows processing operations performed by the media player 350-1 in accordance with one example embodiment.

In step 905, the media player 350-1 receives allocations of a unique value 171 (e.g., W) corresponding to a content publisher (e.g., content publisher 1 160-1). In this manner, the unique value 171 (e.g., W) is exclusively used by the media player 350-1 amongst multiple media players (e.g., media player 350-2, . . . ) to indicate the publisher (e.g., content publisher #1) as a source of played back content (e.g., $C_{11}$, $C_{12}$, $C_{13}$, . . . ).

In step 910, the media player 350-1 generates the unique identifier value via a generator function (e.g., value generator 172 shown in FIG. 1) associated with the media player 350-1. In this manner, the generator function enables anonymous distribution of the log reports 178 such that the publisher does not know an identity of the media player 350-1 that uses the unique identifier value 171 to create the log reports 178. In other embodiments, the media player obtains the values from a remote source.

In step 915, in response to initiating playback of the publisher's content 155, media player 350-1 creates each of multiple log reports 178 to include the unique identifier value 171 (e.g., W) to enable the publisher to identify that different content provided by the publisher was played back by the media player 350-1.

In step 920, the media player 350-1 initiates playback of the first content $C_{11}$ associated with the publisher (e.g., content publisher 1 160-1).

In step 925, the media player 350-1 monitors (e.g., via log report generator 151 shown in FIG. 1) selection of playback commands applied to the first content $C_{11}$.

Figure 10:
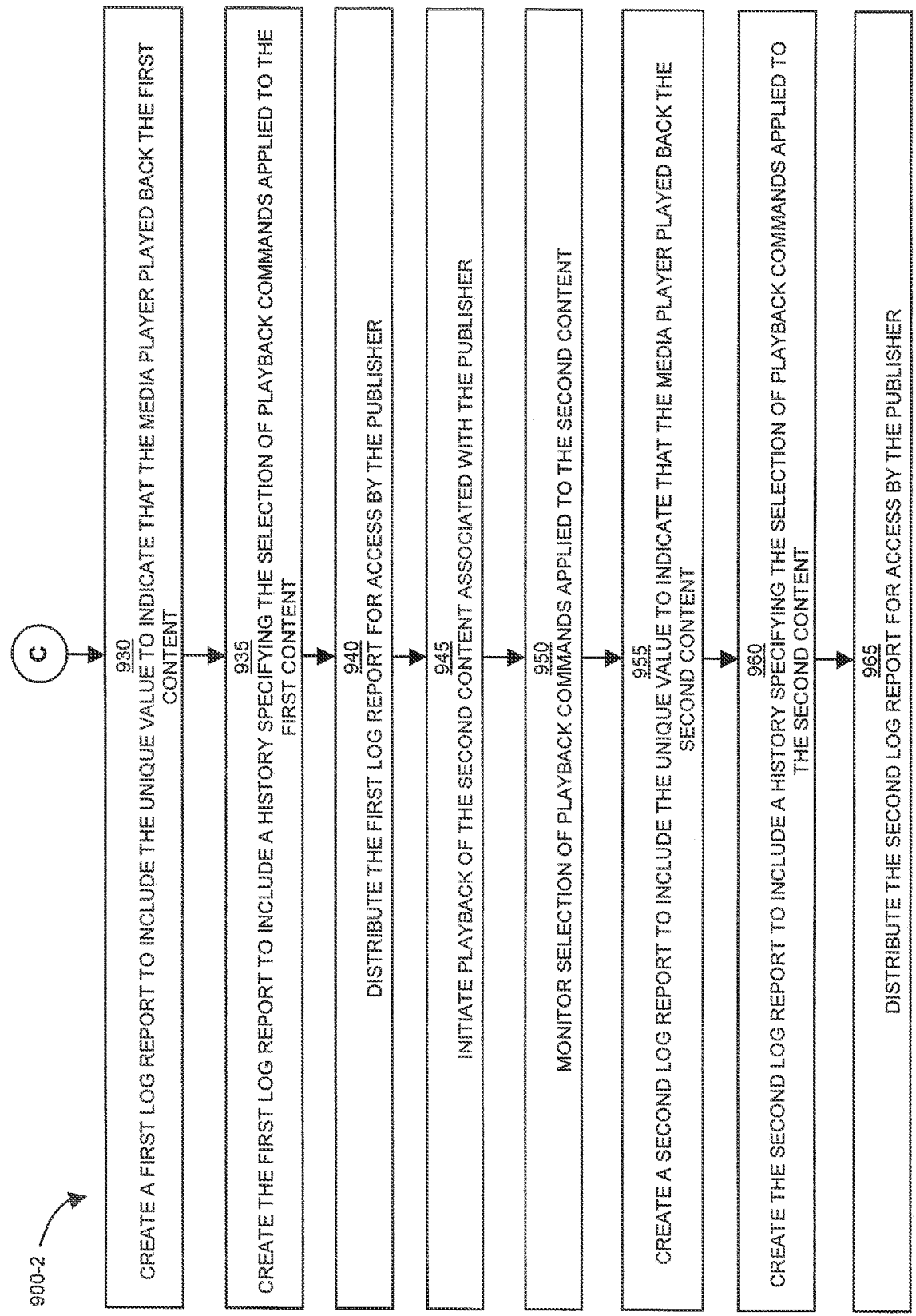

In step 930 of FIG. 10, the media player 350-1 creates a first log report 178-1 to include the unique value 171 (e.g., W) to indicate that the media player 350-1 played back the first content $C_{11}$.

In step 935, the media player 350-1 (e.g., via log report generator 151) creates the first log report 178-1 to include a history specifying the selection of playback commands applied to the first content 155. For example, the history included in the log report 178-1 may indicate that the user 108 entered a pause command 3 times during playback of the content $C_{11}$ in media player 350-1. Initiation of the pause command may indicate a location in the media of interest to a particular viewer. Note again that the history can further include the relative times during playback of the content when the user 108 entered the pause commands.

In step 940, the server distributes the first log report 178-1 for access by the publisher (e.g., publisher client 1 185-1).

In step 945, the server initiates playback of the second content $C_{12}$ associated with the publisher (e.g., content publisher 1 160-1).

In step 950, the media player 350-1 monitors (e.g., via log report generator 151) selection of playback commands applied to the second content $C_{12}$.

In step 955, the server creates a second log report to include the unique value (e.g., W) to indicate that the media player 350-1 played back the second content $C_{12}$. In another embodiment, the media player 350-1 does not create a second log report for events logged during playback of the second content $C_{12}$. Instead, the media player 350-1 creates a second entry in the first log report 178-1 as shown in FIGS. 2 and 3.

In step 960, the server creates the second log report to include a history specifying the selection of playback commands applied to the second content. Processing of step 960 is similar to the processing of step 935 as previously discussed.

In step 965, the server distributes the second log report for access by the publisher (e.g., publisher client 185-1).

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present disclosure. As such, the foregoing description of embodiments of the present application is not intended to be limiting. Rather, any limitations to the invention are presented in the following claims. Note that the different embodiments disclosed herein can be combined or utilized individually with respect to each other.

What is claimed is:

1. A method for identifying portions of content played on media players without revealing the identities of such media players, the method comprising:

receiving, at a server device, a first log report from a first media player, wherein the first log report comprises (i) a first content identifier that identifies a first item of content, the first item of content played by the first media player, (ii) a first unique value that indicates a combination of the first media player and a publisher of the first item of content but does not indicate an identity of the first media player, and (iii) a first playback event associated with the first item of content;

receiving, at the server device, a second log report from a second media player, wherein the second log report comprises (i) a second content identifier that identifies a second item of content, the second item of content played by the second media player, (ii) a second unique value that indicates a combination of the second media player and a publisher of a second item of content, but does not indicate an identity of the second media player, and (iii) a second playback event associated with the second item of content;

storing, by the server device, the first log report and the second log report in a database;

receiving, at the server device from a media publishing device, a query to search the database for playback information relating to content from a particular publisher;

servicing, by the server device, the query by:
  retrieving, the first and second log reports from the database,
  identifying, from the first and second log reports, that the first item of content and the second item of content are associated with the particular publisher by matching the first unique value to a first publisher identifier, matching the second unique value to a second publisher identifier, and determining that the first publisher identifier and the second publisher identifier are identical, and
  generating a response indicating that the first item of content and the second item of content were viewed by different media players, but does not identify the different media players; and responsive to providing the first and second log reports to the media publishing device, receiving, at the server device, from the media publishing device, an additional item of content playable by the first and second media players and making the additional item of content available to the first and second media players.

2. The method according to claim 1, wherein the first playback event or the second playback event includes at least one of play, stop, pause, fast forward, and rewind.

3. The method according to claim 1, wherein the first log report and the second log report include feed events including at least one of subscribe, unsubscribe, check for update notification, check for update, complete, download start, download paused, download resumed, and download completed.

4. The method according to claim 1, wherein the query is received from the particular publisher.

5. A non-transitory computer-readable medium embodying program code executable by a processing device, the non-transitory computer-readable medium comprising program code for:
  receiving, at a server device, a first log report from a first media player, wherein the first log report comprises (i) a first content identifier that identifies a first item of content, the first item of content played by the first media player, (ii) a first unique value that indicates a combination of the first media player and a publisher of the first item of content but does not indicate an identity of the first media player, and (iii) a first playback event associated with the first item of content;
  receiving, at the server device, a second log report from a second media player, wherein the second log report comprises (i) a second content identifier that identifies a second item of content, the second item of content played by the second media player, (ii) a second unique value that indicates a combination of the second media player and a publisher of a second item of content, but does not indicate an identity of the second media player, and (iii) a second playback event associated with the second item of content;
  storing, by the server device, the first log report and the second log report in a database;
  receiving, at the server device from a media publishing device, a query to search the database for playback information relating to content from a particular publisher;
  servicing, by the server device, the query by:
    retrieving, the first and second log reports from the database,
    identifying, from the first and second log reports, that the first item of content and the second item of content are associated with the particular publisher by matching the first unique value to a first publisher identifier, matching the second unique value to a second publisher identifier, and determining that the first publisher identifier and the second publisher identifier are identical, and
    generating a response indicating that the first item of content and the second item of content were viewed by different media players, but does not identify the different media players; and
  responsive to providing the first and second log reports to the media publishing device, receiving, at the server device, from the media publishing device, an additional item of content playable by the first and second media players and making the additional item of content available to the first and second media players.

6. The non-transitory computer-readable medium according to claim 5, wherein the first playback event or the second playback event includes at least one of play, stop, pause, fast forward, and rewind.

7. The non-transitory computer-readable medium according to claim 5, wherein the first log report and the second log report include feed events including at least one of subscribe, unsubscribe, check for update notification, check for update, complete, download start, download paused, download resumed, and download completed.

8. The non-transitory computer-readable medium according to claim 5, wherein the query is received from the particular publisher.

9. A system comprising:
  a digital storage device; and
  a processor coupled with the digital storage device, the processor configured to:
    receive a first log report from a first media player, wherein the first log report comprises (i) a first content identifier that identifies a first item of content the first item of content played by the first media player, (ii) a first unique value that indicates a combination of the first media player and a publisher of the first item of content but does not indicate an identity of the first media player, and (iii) a first playback event associated with the first item of content;
    receive a second log report from a second media player, wherein the second log report comprises (i) a second content identifier that identifies a second item of content, the second item of content played by the second media player, (ii) a second unique value that indicates a combination of the second media player and a publisher of a second item of content, but does not indicate an identity of the second media player, and (iii) a second playback event associated with the second item of content;
store the first log report and the second log report in the digital storage device in a database on the digital storage device;
receive a query from a media publishing device to search the database for playback information relating to content from a particular publisher;
servicing the query by:
retrieving, the first and second log reports from the database,
identifying, from the first and second log reports, that the first item of content and the second item of content are associated with the particular publisher hy matching the first unique value to a first publisher identifier, matching the second unique value to a second publisher identifier, and determining that the first publisher identifier and the second publisher identifier are identical, and
generating a response indicating that the first item of content and the second item of content were viewed by different media players, does not identify the different media players; and
responsive to providing the first and second log reports to the media publishing device, receiving, from the media publishing device, an additional item of content playable by the first and second media players and making the additional item of content available to the first and second media players.

10. The system according to claim 9, wherein the first playback event or the second playback event includes at least one of play, stop, pause, fast forward, and rewind.

11. The system according to claim 9, wherein the first log report and the second log report include feed events including at least one of subscribe, unsubscribe, check for update notification, check for update, complete, download start, download paused, download resumed, and download completed.

12. The system according to claim 9, wherein the query is received from the particular publisher.

13. The method according to claim 1, wherein servicing the query further comprises providing to the media publishing device, log reports received from a plurality of media players, wherein a requestor can use the log reports for determining a level of desirability for portions of items of content based upon an analysis of playback events and playhead positions applied to said items of content.

14. The method according to claim 1, wherein subsequent log reports from the first media player include the first unique value when the subsequent log reports are associated with playback commands applied to content from the particular publisher.

15. The method according to claim 1, wherein the first item of content and the second item of content are identical.

16. The method according to claim 1, wherein the matching further comprises responsive to determining that the first publisher identifier does not exist, randomly generating the first publisher identifier.

17. The method according to claim 1, wherein the query comprises a query publisher identifier and wherein servicing the query further comprises determining that the query publisher identifier matches the first publisher identifier.

18. The method according to claim 1, wherein the query comprises a content identifier and wherein servicing the query further comprises determining that the first item of content and the second item of content are associated with the content identifier.

19. The method according to claim 1, further comprising:
determining that the first item of content and the second item of content are identical; and
determining that the first playback event and the second playback event correspond to an identical subset of the content.

20. The method according to claim 1, wherein receiving the first log report further comprises decrypting the first log report and wherein receiving the second log report further comprises decrypting the second log report.

* * * * *